United States Patent
Zhang et al.

(10) Patent No.: US 6,765,587 B1
(45) Date of Patent: Jul. 20, 2004

(54) IMAGE PROCESSING APPARATUS

(75) Inventors: Xiaomang Zhang, Tenri (JP); Yasuji Obuchi, Nara (JP); Noboru Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/571,846

(22) Filed: May 16, 2000

(30) Foreign Application Priority Data

Jun. 29, 1999 (JP) .......................................... 11-184443

(51) Int. Cl.$^7$ ................................................ G09G 5/00
(52) U.S. Cl. ...................................... 345/606; 345/610
(58) Field of Search .......................... 345/472.1, 472.2, 345/475, 606, 607–610, 615; 348/50, 73, 449, 451, 538; 382/279, 300, 305, 451

(56) References Cited

U.S. PATENT DOCUMENTS

| | | | | |
|---|---|---|---|---|
| 5,991,464 A | * | 11/1999 | Hsu et al. ................... | 382/300 |
| 5,995,154 A | * | 11/1999 | Heimburger ................ | 348/448 |
| 6,108,383 A | * | 8/2000 | Miller et al. ................ | 375/240 |
| 6,480,230 B1 | * | 11/2002 | Honma ........................ | 348/443 |
| 2002/0196472 A1 | * | 12/2002 | Enomoto .................... | 358/3.26 |

FOREIGN PATENT DOCUMENTS

| JP | A8251400 | 9/1996 |
|---|---|---|
| JP | A2685460 | 8/1997 |

* cited by examiner

Primary Examiner—Matthew C. Bella
Assistant Examiner—G. F. Cunningham
(74) Attorney, Agent, or Firm—Birch, Stewart, Kolasch & Birch, LLP

(57) ABSTRACT

An image processing apparatus includes a signal processing section for processing an image signal including a first signal and a second signal. The signal processing section processes the first signal and the second signal using different interpolation programs from each other.

16 Claims, 4 Drawing Sheets

IMAGE PROCESSING APPARATUS

BACKGROUND OF THE INVENTION

1. Field of the Invention

The present invention relates to an image processing apparatus for processing a digital image signal, specifically for processing a luminance signal and chrominance signals of the digital image signal by using respectively different interpolation techniques.

2. Description of the Related Art

Computer graphics and image processing occasionally require geometric transformation of images, such as enlargement and reduction, rotation and deformation. Geometric transformation of vector-type data requires only coordinate transformation of each vector, but geometric transformation of raster images requires other processing in addition to coordinate transformation. Geometric transformation of raster images refers to projection of an existing image to a different coordinate systems based on a given coordinate transformation equation, and requires the following three stages of processing.

1. Coordinate Transformation

Based on a given coordinate transformation equation, an image coordinate of an input image is transformed into an image coordinate of an output image, or an image coordinate of an output image is transformed into an image coordinate of an input image.

2. Rearrangement of an Image

Image data of the input image is rearranged so as to correspond to a lattice arrangement of the output image obtained by the coordinate transformation.

3. Interpolation of Image Data

Image data of pixels (at the intersections of the lattice) which is required for rearrangement is obtained by interpolation. This is performed since post-coordinate transformation image data is not arranged in a lattice in general.

The rearrangement of image data will be described in more detail. Rearrangement of image data can be performed in two different methods. One method is based on the concept of forward transformation. By the concept of forward transformation, the position on the post-coordinate transformation output image coordinate system which corresponds the position of each pixel of an input image is calculated, and the image data of each pixel of the input image is projected onto the calculated position on the post-coordinate transformation output image coordinate system. The other method is based on the concept of reverse transformation. By the concept of reverse transformation, the position on an input image coordinate system which corresponds the position of each pixel of an output image is calculated, and the image data of the calculated position is obtained. Geometric transformations of raster images generally adopt the concept of reverse transformation. In either method, the coordinate of the position obtained by either method is not an integer in general, and thus interpolation is required.

2-1. Method Based on the Concept of Forward Transformation

The position on the post-coordinate transformation output image coordinate system which corresponds the position of each pixel of an input image is calculated. The image data of each pixel of the input image is projected onto the calculated position on the post-coordinate transformation output image coordinate system. Interpolation processing is performed on an output image coordinate system. The image data of each of pixels on the output image is obtained based on the image data of each pixel of the projected input image.

2-2. Method Based on the Concept of Reverse Transformation

The position on an input image coordinate system which corresponds the position of each pixel of an output image is calculated. The image data of the calculated position is obtained. Interpolation processing is performed on the input image coordinate system. The image data of each pixel of the output image is obtained based on the image data of each of the pixels of the input image arranged in a lattice.

In accordance with geometric transformation of raster images, a forward lattice is set on the post-coordinate transformation output image coordinate system, and the input image is transformed into the arrangement of the image data corresponding to the pixels. Whether the method based on the concept of forward transformation or the method based on the concept of reverse transformation is adopted, the coordinate of the corresponding position obtained by calculation (i.e., the coordinate in the output image in the case of forward transformation, and the coordinate in the input image in the case of reverse transformation) is not an integer in general. Accordingly, the image data of the pixel to be interpolated needs to be obtained by interpolation from the image data of other pixels in the vicinity of the pixel to be interpolated.

There are many interpolation techniques usable for geometric transformation of raster images. Hereinafter, the three main techniques (i.e., nearest neighbor interpolation, bi-linear interpolation, and cubic convolution interpolation) will be generally described.

Herein, the three main techniques will be described when rearrangement is performed based on the reverse transformation, which is common to geometric transformations of raster images. In the following description, the input image coordinate of the pixel to be interpolated is represented by (u, v); and the image data of the pixel is represented by P. A pixel having a pixel number of i and a line number of j is represented by (i,j), and the image data of an input image at pixel (i,j) is represented by $P_{i,j}$. Symbol [ ] is a Gaussian symbol and represents that decimals are omitted.

3-1. Nearest Neighbor Interpolation

The image data at pixel $P_{i,j}$, which is closest to pixel P to be interpolated is used as the image data of pixel P. The image data at pixel $P_{i,j}$ is obtained by expression (1).

$$P = P_{i,j} \quad (1)$$

where $i=[u+0.5]$, $j=[v+0.5]$.

This technique generates a positional error of ½ pixel at the maximum, but has advantages that the original data is not destroyed and the processing algorithm is simple.

3-2. Bi-linear Interpolation

The image data of pixel P to be interpolated is obtained using image data of four (2×2) pixels ($P_{i,j}$, $P_{i,j+1}$, $P_{i+1,j}$, $P_{i+1,j+1}$) in the vicinity of pixel P based on expression (2).

$$P = [(i+1)-u][(j+1)-v]P_{i,j} + [(i+1)-u][v-j]P_{i,j+1} + [u-i][(j+1)-v]P_{i+1,j} + [u-i][v-j]P_{i+1,j+1} \quad (2)$$

where $i=[u]$, $j=[v]$

This technique disadvantageously destroys the original data but advantageously obtains the effect of smoothing due to averaging.

3-3. Cubic Convolution Interpolation

The image data of pixel P to be interpolated is obtained using image data of 16 (4×4) pixels ($P_{1,1}, P_{1,2}, \ldots P_{4,4}$) in the vicinity of pixel P, using the cubic convolution function represented by the expression (3).

$$P = [f(y1)f(y2)f(y3)f(y4)] \begin{bmatrix} P_{1,1} & P_{2,1} & P_{3,1} & P_{4,1} \\ P_{1,2} & P_{2,2} & P_{3,2} & P_{4,2} \\ P_{1,3} & P_{2,3} & P_{3,3} & P_{4,3} \\ P_{1,4} & P_{2,4} & P_{3,4} & P_{4,4} \end{bmatrix} \begin{bmatrix} f(x1) \\ f(x2) \\ f(x3) \\ f(x4) \end{bmatrix} \quad (3)$$

Conventional interpolation techniques used for enlarging and reducing images include, for example, a digital image interpolation circuit for performing a plurality of interpolation techniques disclosed by Japanese Laid-Open Publication No. 8-251400. It is not described in the document that the plurality of interpolation techniques are used in parallel for one color image.

Japanese Laid-Open Publication No. 1-142879 discloses that the cubic convolution interpolation is used only for a luminance signal separated from a video signal source, but does not describe anything on processing of chrominance signals.

The above-described cubic convolution interpolation processes the data as follows. Pixels in the vicinity of the pixel to be interpolated are each multiplied with a positive coefficient, and the resultant values are added together, thus to smooth the image. Pixels far from the pixel to be interpolated are each multiplied with a negative coefficient, and the resultant values are added together; i.e., subtraction is performed. Thus, the difference between the value of the pixels in the vicinity of the pixel to be interpolated and the value of the pixels far from the pixel to be interpolated is emphasized. Accordingly, the cubic convolution interpolation has an advantage of smoothing and also sharpening the image, but has a disadvantage of requiring a large amount of calculation.

When, for example, the cubic convolution interpolation is applied for each of R, G and B components of a color image, the processing time period and the memory quantity used are three times larger than in the case of a monochrome image. This is a serious problem to solve in order to apply this technique to mobile devices such as digital cameras.

When the cubic convolution interpolation is applied for chrominance signals, the following problems arise. Since the operation area is as large as 4×4 pixels, the result is influenced by pixels not in the vicinity of the pixel to be interpolated. Since there is a high possibility that pixels not close to one another represent different colors, different colors may be undesirably mixed. In addition, the cubic convolution interpolation involves differential subtraction for emphasizing the difference in pixel values. Thus, a slight difference in color is emphasized. This leads to a significant change in the ratio among the color components and thus amplifies the unintended color deviation.

SUMMARY OF THE INVENTION

In one aspect of the present invention, an image processing apparatus includes a signal processing section for processing an image signal including a first signal and a second signal. The signal processing section processes the first signal and the second signal using respectively different interpolation programs.

In another aspect of the present invention, an image processing apparatus includes a signal processing section for performing signal processing of an image signal including a first signal and a second signal; a program storing section having a plurality of types of interpolation programs stored therein; and a program switching section for selecting one of a first program for processing the first signal and a second program for processing the second signal among the plurality of types of interpolation programs, based on at least one parameter. The signal processing section includes a first signal processing section for processing the first signal using the first program and a second signal processing section for processing the second signal using the second program.

In one embodiment of the invention, the first signal includes a luminance signal, and the second signal includes a chrominance signal.

In one embodiment of the invention, the first program includes a program for executing interpolation in an operation area of 4×4 pixels or larger, and the second program includes a program for executing interpolation in an operation area of 2×2 pixels or smaller.

In one embodiment of the invention, the first program includes a program for executing cubic convolution interpolation, and the second program includes a program for executing at least one of bi-linear interpolation, nearest neighbor interpolation, simple subsampling, and simple interpolation.

In one embodiment of the invention, the program storing section includes a data table which stores a prescribed operation result obtained by the interpolation program.

In one embodiment of the invention, the at least one parameter includes a parameter representing a requirement for one of image quality, processing speed, and power consumption.

In one embodiment of the invention, the signal processing includes enlargement and reduction of the image signal.

In one embodiment of the invention, the image processing apparatus further includes an image input section for receiving the image signal and outputting the first signal and the second signal.

In one embodiment of the invention, the image processing apparatus further includes an image output section for synthesizing the first signal processed by the first signal processing section and the second signal processed by the second signal processing section and outputting the synthesized signal.

In one embodiment of the invention, the image input section includes a CCD camera.

In one embodiment of the invention, the image output section includes a liquid crystal display.

In one embodiment of the invention, the image signal includes a signal representing a still picture.

In one embodiment of the invention, the image signal includes a signal representing a moving picture.

According to the present invention, the signal processing section processes a luminance signal and chrominance signals of an image signal by using respectively different interpolation techniques.

The human eye is more sensitive to the luminance signal than to the chrominance signal. Accordingly, an interpolation technique for providing a high image quality is applied for the luminance signal, and an interpolation technique requiring a small amount of calculation is applied to the chrominance signals. In this manner, the amount of calculation can be reduced thus shortening the data processing time period while maintaining the high image quality. In addition, since the chrominance signals can be represented by a prescribed format (422 system, 411 system, etc.)

requiring a smaller amount of data than the data amount of the original color components, the quantity of a memory required for storing an intermediate result can be reduced.

In the above, "422" and "411" represent the ratio of the amount of information assigned to different signals in the YCrCb system. In the 422 system, information is assigned at the ratio of Y:Cr:Cb=4:2:2. In the 411 system, information is assigned at the ratio of Y:Cr:Cb=4:1:1. In other words, the amount of information is compressed in order to reduce the required quantity of memory, utilizing the fact that the human eye is less sensitive to color difference than to luminance difference.

In an embodiment where an interpolation technique performed in a small operation area is applied for the chrominance signals, the following effects are provided. The color difference, which is otherwise generated due to the distance between the pixels used for interpolation, is less likely generated. Since differential operations are not involved, color deviation can be avoided.

Therefore, the data processing time period can be shortened and the quantity of memory used can be reduced. In addition, an image fulfilling the requirements regarding image quality, processing speed, power consumption and the like, with substantially no color deviation, can be provided.

The above-described effect is achieved by, for example, applying an interpolation performed in an operation area of 4×4 pixels or more for the luminance signal and applying an interpolation performed in an operation area of 2×2 pixels or less for the chrominance signals.

The above-described effect is achieved by, for example, applying cubic convolution interpolation for the luminance signal and applying bi-linear interpolation, nearest neighbor interpolation, simple subsampling, or simple interpolation for the chrominance signals.

The image processing apparatus according to the present invention can include a program storing section having a plurality of types of interpolation programs stored therein, a program switching section for selecting one of interpolation programs for performing signal processing in accordance with the requirements, and a signal processing section for performing signal processing using different interpolation techniques for a luminance signal and chrominance signals of a digital image signal.

Therefore, an optimum program can be selected among a plurality of types of interpolation programs stored in the program storing section in accordance with the requirements regarding image quality, processing speed, power consumption and the like; and the signal processing section can process the luminance signal and the chrominance signals using different interpolation techniques.

The image processing apparatus according to the present invention can be applied to, for example, a digital still camera having a moving picture shooting function. A main function of a digital still camera is shooting of a still picture. A high image quality with a great number of pixels is required for a still picture. For a moving picture, each of images of a moving picture has a small number of pixels since the amount of data which can be transferred per a unit time is limited due to, for example, the limitation on the capacity of the memory of the digital still camera (i.e., limitation of the shooting time period) and the limitation on the band width of the data transfer path. Nor is such a high image quality required.

Accordingly, various interpolation techniques can be used as follows. During digital zooming when shooting a still picture, cubic convolution interpolation is applied for the luminance signal and a simpler interpolation technique is applied for the chrominance signals. During digital zooming when shooting a moving picture, bi-linear interpolation is, for example, applied for the luminance signal and a simpler interpolation technique is applied for the chrominance signals.

Thus, an image fulfilling the requirements regarding image quality, processing speed, power consumption and the like, with substantially no color deviation, can be provided.

In an embodiment where a data table having a prescribed operation result of the interpolation program is used as the interpolation program, the amount of operation can be reduced and the data processing speed is further raised.

Thus, the invention described herein makes possible the advantages of providing an image processing apparatus for processing a digital image signal in a shorter period of time with a smaller quantity of memory while fulfilling specific requirements (parameters) regarding image quality, processing speed, power consumption and the like, and thus providing an image with substantially no color deviation.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
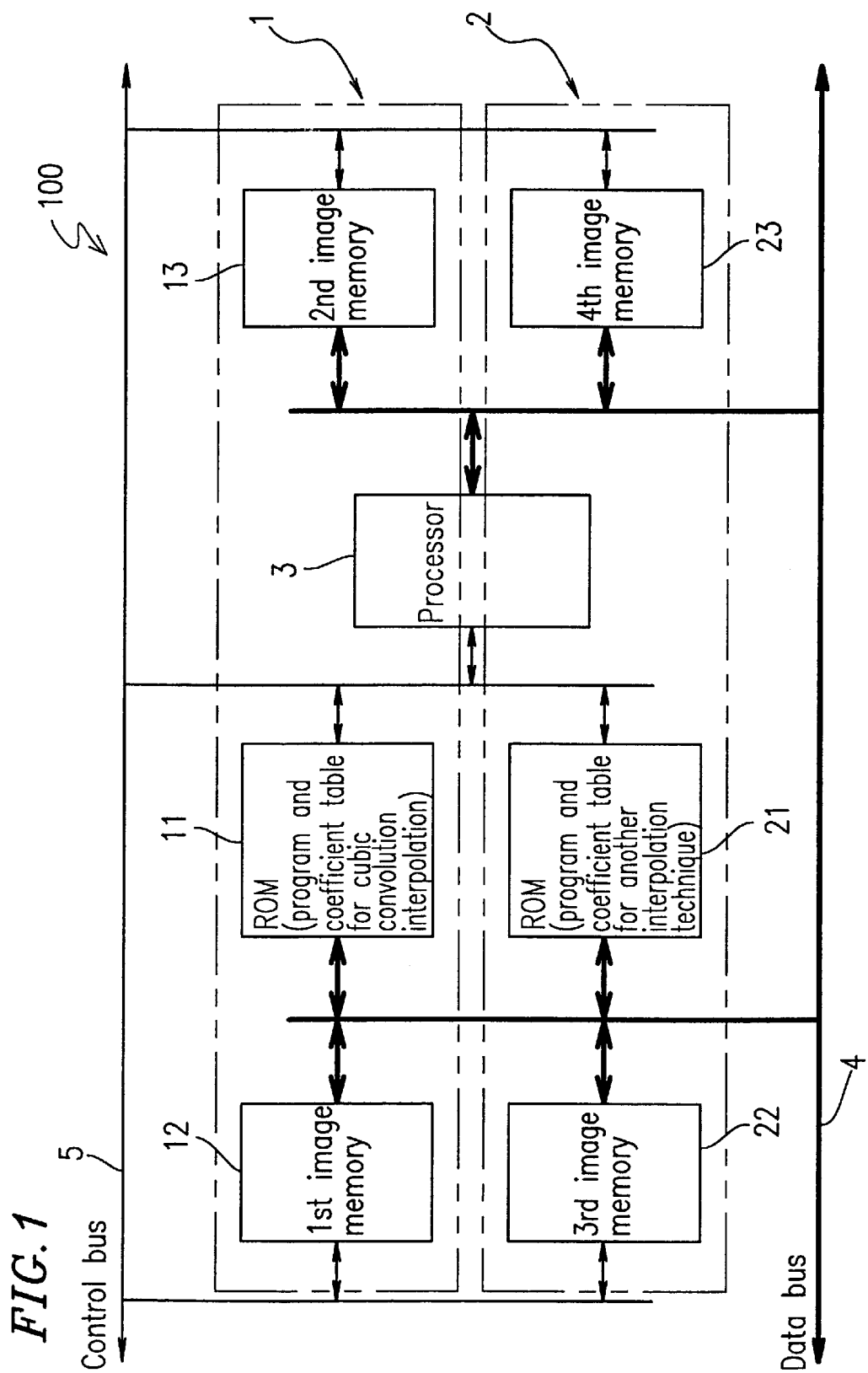
FIG. 1 is a block diagram illustrating a structure of an image processing apparatus in an example according to the present invention when applied to a digital zoom function for interpolating a digital image obtained by a digital camera.

FIG. 1 is a block diagram illustrating an structure of an image processing apparatus 100 in one example according to the present invention when applied to a digital zoom function for interpolating a digital image obtained by a digital camera.

As shown in FIG. 1, the image processing apparatus 100 includes a luminance signal processing section 1 for processing data of a luminance signal of a digital image and a chrominance signal processing section 2 for processing data of chrominance signals of the digital image. The digital image is divided into a luminance signal and chrominance signals, and the luminance signal and the chrominance signals a re processed by using respectively different programs.

Herein, colors in a color image are represented by a YUV (=YCrCb) system, which uses a luminance signal Y and chrominance signals Cr and Cb. The present invention is not limited to the YUV system and is applicable to other systems.

Still referring to FIG. 1, the luminance signal processing section 1 includes a first image memory 12 for storing a luminance signal Y before data processing, a ROM 11 having a program and a coefficient table for cubic convolution interpolation stored therein, a second image memory 13 for storing a luminance signal Y after data processing, and a processor 3 for performing a data operation using, for example, an ARM core. The processor 3, the first image memory 12, the ROM 11, and the second image memory 13 are controlled through a control bus 5, and the luminance signal Y of an image data transferred through a data bus 4 is processed.

The data processing of the luminance signal Y is specifically performed in the following manner. The luminance signal Y of the image data transferred through the data bus 4 is stored in the first image memory 12, and then the program and the coefficient table for cubic convolution interpolation are read from the ROM 11. The pre-data processing luminance signal Y is read from the first image memory 12 and processed with an operation by the processor 3 to obtain the post-data processing luminance signal Y. The post-data processing luminance signal Y is stored in the second image memory 13.

The chrominance signal processing section 2 includes a third image memory 22 for storing chrominance signals Cr and Cb before data processing, a ROM 21 having a program and a coefficient table for an interpolation technique which is different from the cubic convolution interpolation stored therein, a fourth image memory 23 for storing chrominance signals Cr and Cb after data processing, and the processor 3 which is shared with the luminance signal processing section 1. The processor 3, the third image memory 22, the ROM 21, and the fourth image memory 23 are controlled through the control bus 5, and the chrominance signals Cr and Cb of the image data transferred through the data bus 4 are processed.

The data processing of the chrominance signals Cr and Cb is specifically performed in the following manner. The chrominance signals Cr and Cb of the image data transferred through the data bus 4 are stored in the third image memory 22, and then the program and the coefficient table for the interpolation technique different from the cubic convolution interpolation are read from the ROM 21. The pre-data processing chrominance signals Cr and Cb are read from the third image memory 22 and processed with an operation by the processor 3 to obtain the post-data processing chrominance signals Cr and Cb. The post-data processing chrominance signals Cr and Cb are stored in the fourth image memory 23.

In addition to the YUV (=YCrCb) system, there are some other systems for representing colors in a color image; for example, an RGB system, a CMY system, and a YIQ system.

The YUV (=YCrCb) system represents colors in a color image with Y signal (luminance), U signal (bluish color component Cb) and V (reddish color component Cr). The YUV system is generally used for compression by subsampling in image processing, utilizing the fact that the human eye is less sensitive to color difference than to brightness difference.

The RGB system represents colors in a color image with three primary colors of R (red), G (green) and B (blue). The RGB system is often used in display devices.

The CMY system represents colors in a color image with three primary colors of C (cyan), M (magenta) and Y (yellow). The CMY system is often used for printing.

The YIQ system represents colors in a color image with Y signal (representing luminance), I signal (representing flesh color) and Q signal (representing colors other than flesh color). The YIQ system is used in TV broadcasting in, for example, the U.S. and Japan. The reasons why the YIQ system can be used for TV broadcasting is that color broadcasting can be received by monochrome TVs due to the Y signal and thus is compatible with the monochrome TVs, and that the YIQ system is convenient to compress the Q signal (representing colors other than flesh color). The Q signal is compressed since the human eye is sensitive to deviation in the I signal (representing flesh color).

Hereinafter, the luminance signal and the chrominance signals will be described in detail.

The RGB signals representing the three primary colors, and the luminance signal Y and the chrominance signals Cr and Cb, which are used to represent a color image, have the relationship represented by expression (4).

$$\begin{pmatrix} Y \\ Cr \\ Cb \end{pmatrix} = \begin{pmatrix} 0.30 & 0.59 & 0.11 \\ 0.70 & -0.59 & -0.11 \\ -0.30 & -0.59 & 0.89 \end{pmatrix} \begin{pmatrix} R \\ G \\ B \end{pmatrix} \quad (4)$$

IQ signals are often used instead of the chrominance signals Cr and Cb. The RGB signals have the relationship represented by expression (5) with the YIQ signals.

$$\begin{pmatrix} Y \\ I \\ Q \end{pmatrix} = \begin{pmatrix} 0.30 & 0.59 & 0.11 \\ 0.60 & -0.28 & -0.32 \\ 0.21 & -0.52 & 0.31 \end{pmatrix} \begin{pmatrix} R \\ G \\ B \end{pmatrix} \quad (5)$$

The YCrCb system and the YIQ system are common in the coordinate axis in color cube (described below) in luminance area and different in the coordinate axis in color area. In the YCrCb system, chrominance information is represented based on the coordinate axis in the red direction and the coordinate axis in the blue direction; and in the YIQ system, chrominance information is represented based on the coordinate axis in the flesh color direction and the coordinate axis perpendicular thereto. This is why expressions (4) and (5) are identical in the coefficients corresponding to Y and different in the other coefficients.

Since the memory quantity used can be reduced by representing a color image with a luminance signal and chrominance signals, image data is often handled in the state of being divided into a luminance signal and chrominance signals in image processing and data transfer.

In more detail, a digital component video signal is recorded in the state of being divided into a luminance signal Y and two chrominance signals Cr and Cb (three signals in total). The luminance signal Y represents the brightness, i.e., the gradation from white to black. The chrominance signals Cr and Cb represent hue and saturation of the color. The luminance signal Y and the chrominance signals Cr and Cb refer to three axes perpendicular to one another. A diagram represented by the three axes is referred to as a "color cube". Any color can be selected by selecting a coordinate in the three axes.

In a so-called D1 system, the three axes are not treated equally. The ratio of the sampling frequencies of the luminance signal Y and the chrominance signals Cr and Cb is set to be 4:2:2. In other words, the sampling frequencies of the chrominance signals is only half of the sampling frequency of the luminance signal, based on the theory that the human eye can recognize the hue and saturation of the color at only a half level compared to the brightness of the color. Due to the above-mentioned ratio, the sampling frequencies of the chrominance signals Cr and Cb are each 6.75 MHz (4:2:2= 13.5:6.75:6.75). Sampling is performed approximately every 0.0000001482 seconds; i.e., 360×480=172,800 pixels.

In the D1 system, each pixel is supplied with 8 bit information, which means 256-stages of gradation. In the case of a luminance signal, the colors between the complete whiteness to the complete blackness is represented by 256 different gray colors. Such a system does not cause any serious problem when the luminance different is sufficiently great. When the gradation having a slight luminance difference is displayed, the 256-color palette is not sufficient and results in step-by-step display.

A so-called D5 system realizes improvement on this point. In the D5 system, a digital component video signal is recorded with 10 bits of 4:2:2. In this case, the gradation between the complete whiteness and the complete blackness is represented by 1024 gray colors.

Next, an interpolation technique applied for the luminance signal will be described in detail.

From the viewpoint of putting greater importance on the luminance signal, cubic convolution interpolation is applied in order to provide a high image quality for enlargement and reduction of images.

Based on expression (6), a weighting coefficient generally used in cubic convolution interpolation is generated.

$$f(t)=\sin \pi t/\pi t \tag{6}$$

The sin functions in expression (6) cannot be digitally operated and thus cannot realize LSI as it is. Accordingly, expression (6) is approximated by expressions (7-1) through (7-3) which only includes addition and multiplication. Different expressions are used for generating a coefficient in accordance with the value of |t|, which is the distance from the pixel to be interpolated.

$$f(t)=(a+2)|t|^3-(a+3)|t|^2+1 \quad 0\leq|t|<1 \tag{7-1}$$

$$f(t)=a|t|^3-5a|t|^2+8a|t|-4a \quad 1\leq|t|<2 \tag{7-2}$$

$$f(t)=0 \quad 2\leq|t| \tag{7-3}$$

In expressions (7-1) through (7-3), "a" represents actual constant, "t" represents distance variable regarding the distance from the pixel to be interpolated to another pixel in the vicinity of the pixel to be interpolated, and f represents a weighting coefficient.

The weighting coefficient used for cubic convolution interpolation is generated as follows using expression (6).

Figure 2A:
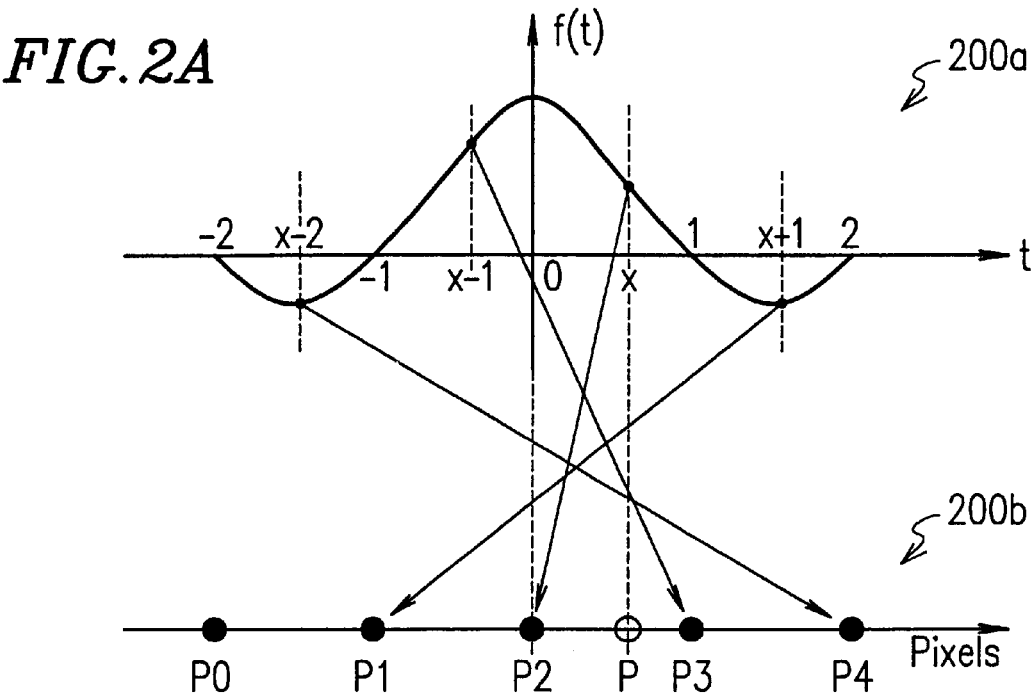
FIG. 2A is a diagram illustrating a method for generating a weighting coefficient used for cubic convolution interpolation.

FIG. 2A is a diagram illustrating a method for generating a weighting coefficient used for cubic convolution interpolation. First, as shown in graph 200a in FIG. 2A, the functions in expression (6) are represented in the range of variable t∈(−2,2). In order to interpolate pixel P by pixels P2 and P3 included in one-dimensional image data, the position of the pixel P2 (or P3) adjacent to pixel P is aligned with origin 0 in graph 200a, and then pixels P1 through P4 are arranged as shown in graph 200b.

Then, point x, on axis t, corresponding to pixel P is found. The value of the function f(x−2), f(x−1), f(x), f(x+1) at points x−2, x−1, x, and x+1 are values of the four weighting coefficients used for interpolating pixel P by cubic convolution interpolation.

The value of the pixel P to be interpolated is found by expression (8).

$$P=f(x)P2+f(x+1)P1+f(x-1)P3+f(x-2)P4 \tag{8}$$

In the case of "on-line calculation", expressions (9-1) through (9-3) can be used. Expressions (9-1) through (9-3) are obtained by substituting "a" in expressions (7-1) through (7-3) with −1.

$$f(t)=|t|^3-2|t|^2+1 \quad 0\leq|t|<1 \tag{9-1}$$

$$f(t)=-|t|^3+5|t|^2-8|t|+4 \quad 1\leq|t|<2 \tag{9-2}$$

$$f(t)=0 \quad 2\leq|t| \tag{9-3}$$

The "on-line calculation" refers to real-time calculation, i.e., real-time processing performed in response to zoom operation while shooting photos.

For performing digital zoom with DSP (digital signal processor), expressions (7-1) through (7-3) can be stored in a data table for raising the speed of processing.

In the case where the zoom magnification is fixed, the coordinate of the pixel to be interpolated (i.e., the value of t in expression (6)) is determined. Accordingly, only the necessary values among the coefficients f obtained by expressions (7-1) through (7-3) can be stored in the coefficient table in the ROM 11. In this case, the operations corresponding to expressions (9-1) through (9-3) are not necessary and the amount of operations is reduced. Thus, the speed of data processing is raised.

However, in the case where continuous enlargement and reduction for the zoom function is required, the coefficient f(t) needs to be obtained by the operations of expressions (9-1) through (9-3).

Accordingly, both of the systems can be mounted on one chip (ROM 11) so that one of the systems is selected in accordance with the application.

In the above description, coefficient f is obtained using the coordinates of the pixels before the interpolation (which surround the pixel to be interpolated) as the basis. Alternatively, coefficient f can be obtained using the coordinate of the pixel to be interpolated as the basis.

Figure 2B:
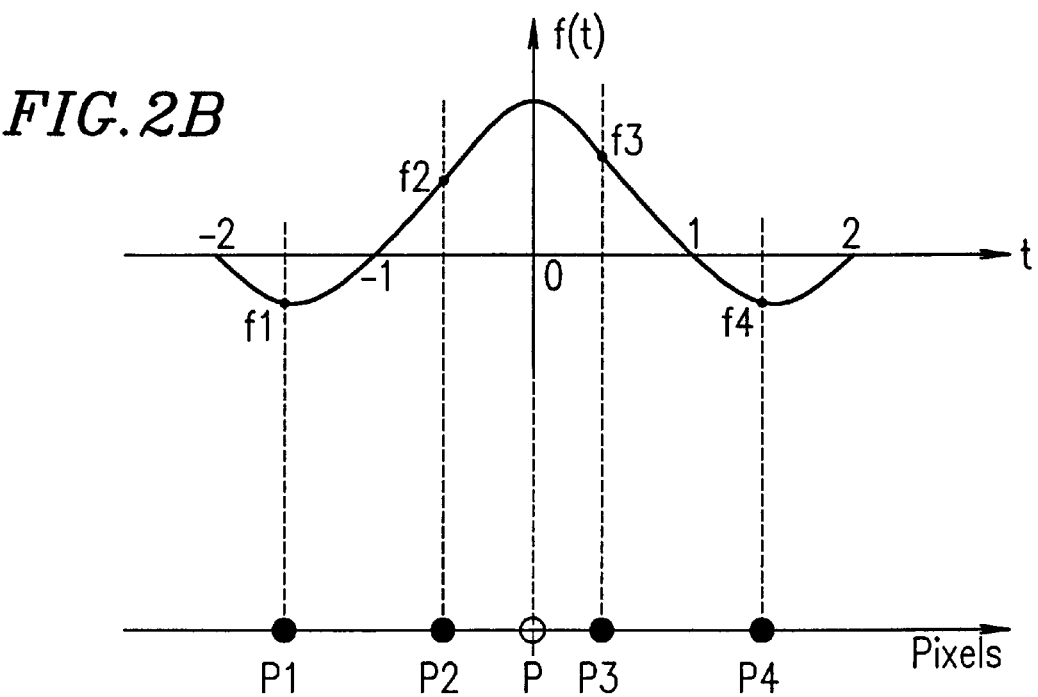
FIG. 2B is a diagram illustrating a principle for obtaining coefficient f using the coordinate of the pixel to be interpolated as the basis.

FIG. 2B is a diagram illustrating a principle for obtaining coefficient f using the coordinate of the pixel to be interpolated as the basis. As shown in FIG. 2B, the position of pixel P to be interpolated is aligned to t=0. In this state, lines perpendicular to the straight line connecting pixels P1 through P4 are drawn from pixels P1 through P4, and the values of f(t) crossing the perpendicular lines, i.e., coefficients f1 through f4 are found.

The value of pixel P to be interpolated can be found by expression (10), i.e., by multiplying coefficients f1 through f4 and corresponding pixel values P1 through P4 respectively and then adding the results of multiplications.

$$P=f1\cdot P1+f2\cdot P2+f3\cdot P3+f4\cdot P4 \tag{10}$$

The methods shown in FIGS. 2A and 2B are only different in the pixel to be used as the basis, and provide the same coefficients. The method shown in FIG. 2B is considered to be simpler and more easily realized in terms of programming.

Hereinafter, an interpolation technique applied to chrominance signals will be described.

There are two chrominance signals Cr and Cb. Accordingly, in the case where the ratio of the two chrominance signals regarding one pixel after a zoom operation is significantly different from the ratio before the zoom operation, an unnatural-looking image is obtained due to color deviation. For this reason, the interpolation technique applied to the chrominance signals preferably does not include differential operations. The operation area is preferably narrow, specifically 2×2 pixels or less.

Expression (10) is directed to a one dimensional operation for simplicity. In actuality, interpolation is applied to a two-dimensional area of 4×4 pixels. The image data of pixel P to be interpolated is obtained using the image data of 16 (4×4) pixels ($P_{1,1}, P_{1,2} \ldots P_{4,4}$) in the vicinity of pixel P to be interpolated and also using the cubic convolution interpolation function represented by expression (11).

$$P = [f(y1)f(y2)f(y3)f(y4)] \begin{bmatrix} P_{1,1} & P_{2,1} & P_{3,1} & P_{4,1} \\ P_{1,2} & P_{2,2} & P_{3,2} & P_{4,2} \\ P_{1,3} & P_{2,3} & P_{3,3} & P_{4,3} \\ P_{1,4} & P_{2,4} & P_{3,4} & P_{4,4} \end{bmatrix} \begin{bmatrix} f(x1) \\ f(x2) \\ f(x3) \\ f(x4) \end{bmatrix} \quad (11)$$

EXAMPLE 2

Figure 3:
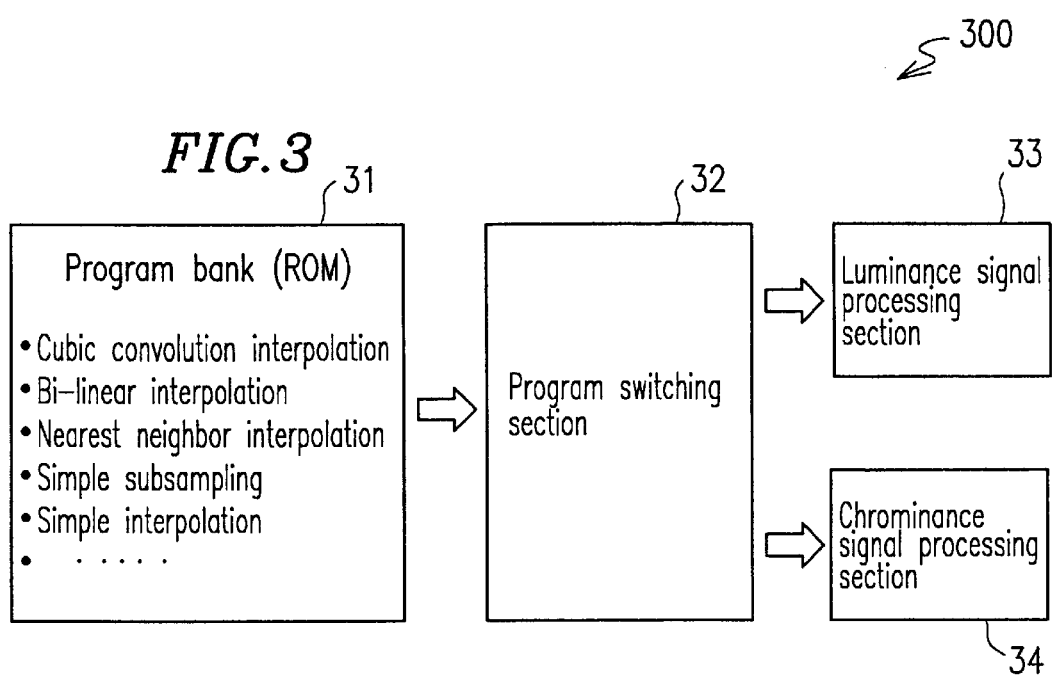
FIG. 3 is a block diagram illustrating a structure of an image processing apparatus in another example according to the present invention.

FIG. 3 is a block diagram illustrating a structure of an image processing apparatus 300 in another example according to the present invention. The image processing apparatus 300 includes a program bank 31 including a ROM or the like which stores a plurality of types of interpolation programs, a program switching section 32 for selecting one of the plurality of types of interpolation programs for performing signal processing in accordance with the requirements regarding image quality, processing speed, power consumption and the like, and a luminance signal processing section 33 and a chrominance signal processing section 34 respectively for processing a luminance signal and chrominance signals of an image signal using different interpolation techniques.

The program bank 31 has a plurality of types of interpolation programs stored therein, for example, programs for cubic convolution interpolation, bi-linear interpolation, nearest neighbor interpolation, simple subsampling, and simple interpolation. An optimum interpolation program is selected by the program switching section 32 in accordance with the requirements regarding image quality, processing speed, power consumption, and the like. An image signal is divided into a luminance signal and chrominance signals, which are respectively processed by the luminance signal processing section 33 and the chrominance signal processing section 34 using respective interpolation techniques from each other.

For example, the luminance signal is processed using an interpolation technique performed in an operation area of 4×4 pixels or greater, and the chrominance signals are processed using an interpolation technique performed in an operation area of 2×2 pixels or smaller.

The luminance signal can be processed by cubic convolution interpolation, and the chrominance signals can be processed by bi-linear interpolation, nearest neighbor interpolation, simple subsampling, or simple interpolation.

More specifically, the image processing apparatus 300 in the second example will be described when applied to a digital still camera having a moving picture shooting function.

EXAMPLE 3

Figure 4:
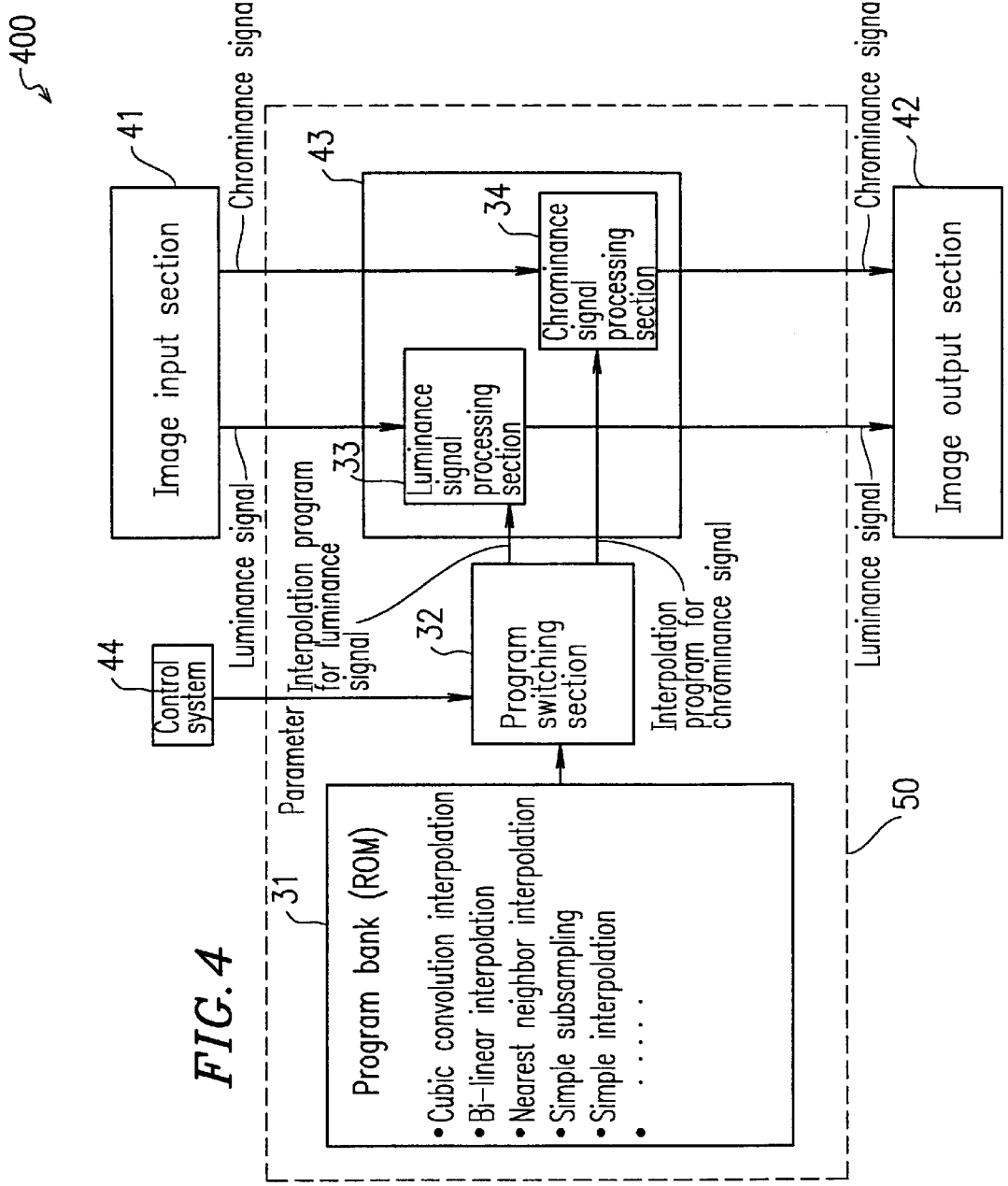
FIG. 4 is a block diagram illustrating a structure of an image processing apparatus in still another example according to the present invention.

FIG. 4 is a block diagram of an image processing apparatus 400 in still another example according to the present invention.

The image processing apparatus 400 is used for a digital camera, for example, but is not limited to this.

The image processing apparatus 400 includes an image processing section 50, an image input section 41, an image output section 42, and a control system 44.

The image processing section 50 includes the program bank 31, the program switching section 32 and a signal processing section 43. The signal processing section 43 includes the luminance signal processing section 33 and the chrominance signal processing section 34.

The program bank 31, the program switching section 32, the luminance signal processing section 33 and the chrominance signal processing section 34 are as described above.

The image input section 41 includes an optical device for inputting an image into the image processing apparatus 400, for example, a CCD camera. The image output section 42 includes an image display device, for example, a liquid crystal display.

The image processing apparatus 400 can further include known devices, such as, for example, a memory for storing a still picture or a moving picture obtained by shooting and a recording medium for recording an image signal.

The control system 44 switches the application used by the image processing apparatus 400. The applications include, for example, a still picture shooting function in a digital still camera and a moving picture shooting function.

Hereinafter, an operation principle of the image processing apparatus 400 will be described.

The image input section 41 divides an image signal obtained by shooting, into a luminance signal and chrominance signals, and inputs the luminance signal to the luminance signal processing section 33 and inputs the chrominance signals into the chrominance signal processing section 34 of the signal processing section 43.

The program switching section 32 selects an interpolation program for the luminance signal and an interpolation program for the chrominance signal among the plurality of types of interpolation programs stored in the program bank 31 based on the parameter which is input from the control system 44.

In more detail, the parameter input from the control system 44 includes information that the operation currently performed is digital zoom in moving picture shooting. Based on the information, the program switching section 32 selects an interpolation program for the luminance signal and an interpolation program for the chrominance signal. In the case of digital zoom in moving picture shooting, bi-linear interpolation is, for example, selected as the program for the luminance signal, since the processing speed has a higher priority over the image quality. As the program for the chrominance signals, simple interpolation is, for example, selected.

The luminance signal processing section 33 processes the luminance signal using the selected interpolation program for the luminance signal, and the chrominance signal processing section 34 processes chrominance signals using the selected interpolation program for the chrominance signals.

The signal processing is, for example, enlargement and reduction in zooming in a digital still camera. The result of the signal processing is output to the image output section 42.

The image output section 42 synthesizes the post-signal processing luminance signal and the post-signal processing chrominance signals. The synthesized image signal is displayed on, for example, a liquid crystal display.

A main function of a digital still camera is shooting of a still picture. A high image quality with a great number of pixels is required for a still picture. For a moving picture, each of images of a moving picture has a small number of pixels since the amount of data which can be transferred per a unit time is limited due to, for example, the limitation on the capacity of the memory mounted on the digital still camera (i.e., limitation of the shooting time period) and the limitation on the band width of the data transfer path. Nor is such a high image quality required.

Accordingly, different interpolation techniques can be applied as follows. During digital zooming when shooting a still picture, cubic convolution interpolation is applied for the luminance signal and a simpler interpolation technique is applied for the chrominance signals. During digital zooming when shooting a moving picture, bi-linear interpolation is, for example, applied for the luminance signal and a simpler interpolation technique is applied for the chrominance signals.

In this manner, various interpolation techniques are stored in the ROM in the program bank 31. Then, the optimum interpolation technique can be selected for the luminance signal or the chrominance signal in accordance with the parameters required by each target system and each application such as, for example, image quality, processing speed, and power consumption. In the above example of the digital still camera, the control system of the digital still camera corresponds to the target system, and the still picture shooting function and the moving picture shooting function correspond to the applications.

In the above examples, cubic convolution interpolation is applied to the luminance signal and another interpolation technique performed in a smaller operation area is applied for the chrominance signals. The present invention is not limited to this, and allows an optimum interpolation program to be selected in accordance with the requirements regarding image quality, processing speed, power consumption, and the like.

According to the present invention, as described above, the signal processing section performs signal processing using different interpolation techniques for a luminance signal and chrominance signals of a digital image signal. Therefore, the data processing time period can be shortened and the quantity of memory used can be reduced. In addition, an image fulfilling the requirements regarding image quality, processing speed, power consumption and the like, with substantially no color deviation, can be provided.

The human eye is more sensitive to the luminance signal than to the chrominance signal. Accordingly, an interpolation technique for providing a high image quality is applied for the luminance signal, and an interpolation technique requiring a small amount of calculation is applied to the chrominance signals. In this manner, the amount of calculation can be reduced thus shortening the data processing time period while maintaining the high image quality. In addition, since the chrominance signals can be represented by a prescribed format (422 system, 411 system, etc.) requiring a smaller amount of data than the data amount of the original color components, the quantity of a memory required for storing an intermediate result can be reduced.

In an embodiment where an interpolation technique performed in a small operation area is applied for the chrominance signals, the following effects are provided. The color difference, which is otherwise generated due to the distance between the pixels used for interpolation, is less likely generated. Since differential operations are not involved, color deviation can be avoided.

The above-described effect is achieved by, for example, applying an interpolation performed in an operation area of 4×4 pixels or more for the luminance signal and applying an interpolation performed in an operation area of 2×2 pixels or less for the chrominance signals.

The above-described effect is achieved by, for example, applying cubic convolution interpolation for the luminance signal and applying bi-linear interpolation, nearest neighbor interpolation, simple subsampling, or simple interpolation for the chrominance signals.

The image processing apparatus according to the present invention can include a program storing section having a plurality of types of interpolation programs stored therein, a program switching section for selecting one of interpolation programs for performing signal processing in accordance with the requirements, and a signal processing section for performing signal processing using different interpolation techniques for a luminance signal and chrominance signals of a digital image signal. Therefore, an optimum program can be selected among a plurality of types of interpolation programs stored in the program storing section in accordance with the requirements regarding image quality, processing section, power consumption and the like by a program switching section; and the signal processing section can process the luminance signal and the chrominance signals using different interpolation techniques.

When, for example, the image processing apparatus according to the present invention is applied to a digital still camera having a moving picture shooting function, various interpolation technique can be used as follows. During digital zooming when shooting a still picture, cubic convolution interpolation is applied for the luminance signal and a simpler interpolation technique is applied for the chrominance signals. During digital zooming when shooting a moving picture, bi-linear interpolation is, for example, applied for the luminance signal and a simpler interpolation technique is applied for the chrominance signals. Thus, an image fulfilling the requirements regarding image quality, processing speed, power consumption and the like, with substantially no color deviation, can be provided.

In an embodiment where the interpolation program is stored in a data table having a prescribed operation result of the interpolation program stored therein, the amount of operation can be reduced and the data processing speed is further raised.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing apparatus for processing an image signal including a luminance signal and a chrominance signal, said apparatus comprising:

a luminance signal processing section for processing said luminance signal of said image signal; and a chrominance processing section for processing said chrominance signal of said image signal, wherein each said signal processing section processes the luminance signal and the chrominance signal using different interpolation programs from each other, the chrominance signal being represented by a prescribed format requiring a smaller amount of data and calculation than the luminance signal.

2. An image processing apparatus, comprising:
a signal processing section for performing signal processing of an image signal including a luminance signal and a chrominance signal;
an optimum program storing section having a plurality of types of interpolation programs stored therein; and
an optimum program switching section for selecting an optimum luminance program for processing the luminance signal and an optimum chrominance program for processing the chrominance signal among the plurality of types of interpolation programs, based on at least one parameter,
wherein said signal processing section includes a separate and distinct luminance signal processing section for processing the luminance signal using the optimum luminance program and a separate and distinct chrominance signal processing section for processing the chrominance signal using the optimum chrominance program.

3. The image processing apparatus according to claim 2, wherein:
the optimum luminance program includes a program for executing interpolation in an operation area of 4×4 pixels or larger, and
the optimum chrominance program includes a program for executing interpolation in an operation area of 2×2 pixels or smaller.

4. The image processing apparatus according to claim 2, wherein:
the optimum luminance program includes a program for executing cubic convolution interpolation, and
the optimum chrominance program includes a program for executing at least one of bi-linear interpolation, nearest neighbor interpolation, simple subsampling, and simple interpolation.

5. The image processing apparatus according to claim 2, wherein the optimum program storing section includes a data table which stores a prescribed operation result obtained by the interpolation program.

6. An image processing apparatus for performing signal processing of an image signal including a luminance signal and a chrominance signal, comprising:
an optimum program storing section having a plurality of types of interpolation programs stored therein;
an optimum program switching section for selecting one of a first optimum program for processing the luminance signal and a second optimum program for processing the chrominance signal among the plurality of types of interpolation programs, based on at least one parameter; and
a first signal processing section for processing the luminance signal using the first optimum program and a second signal processing section for processing the chrominance signal using the second optimum program,
wherein the at least one parameter includes a parameter representing requirement for one of image quality, processing speed, and power consumption.

7. An image processing apparatus, comprising:
a signal processing section for processing an image signal including a luminance signal and a chrominance signal, wherein the signal processing section processes the luminance signal and the chrominance signal using different optimum interpolation programs from each other and the signal processing includes enlargement and reduction of the image signal.

8. The image processing apparatus according to claim 2, further comprising an image input section for receiving the image signal and outputting the luminance and the chrominance signal.

9. An image processing apparatus, comprising:
a signal processing section for performing signal processing of an image signal including a luminance signal and a chrominance signal;
an optimum program storing section having a plurality of types of interpolation programs stored therein;
an optimum program switching section for selecting one of an optimum luminance program for processing the luminance signal and an optimum chrominance program for processing the chrominance signal among the plurality of types of interpolation programs, based on at least one parameter;
an image output section for synthesizing the luminance signal processed by the first signal processing section and the chrominance signal processed by the chrominance signal processing section and outputting the synthesized signal,
wherein the signal processing section includes a luminance signal processing section for processing the luminance signal using the optimum luminance program and a chrominance signal processing section for processing the chrominance signal using the optimum chrominance program.

10. An image processing apparatus, comprising:
a signal processing section for performing signal processing of an image signal including a luminance signal and a chrominance signal;
an optimum program storing section having a plurality of types of interpolation programs stored therein;
an optimum program switching section for selecting one of an optimum luminance program for processing the luminance signal and an optimum chrominance program for processing the chrominance signal among the plurality of types of interpolation programs, based on at least one parameter; and
an image input section including a CCD camera for receiving the image signal and outputting the luminance signal and the chrominance signal,
wherein the signal processing section includes a luminance signal processing section for processing the luminance signal using the optimum luminance program and a chrominance signal processing section for processing the chrominance signal using the optimum chrominance program.

11. An image processing apparatus for performing signal processing of an image signal including a luminance signal and a chrominance signal, comprising:
an optimum program storing section having a plurality of types of interpolation programs stored therein;
an optimum program switching section for selecting one of a first optimum program for processing the luminance signal and a second optimum program for processing the chrominance signal among the plurality of types of interpolation programs, based on at least one parameter;
a first signal processing section for processing the luminance signal using the first optimum program and a second signal processing section for processing the chrominance signal using the second optimum program; and
an image output section for synthesizing the first signal processed by the first signal processing section and the second signal processed by the second signal processing section and outputting the synthesized signal, and said image output section includes a liquid crystal display.

12. An image processing apparatus, comprising:

a signal processing section for processing an image signal including a luminance signal and an optimum chrominance signal, the signal processing section including a luminance processing section for processing the luminance signal and an optimum chrominance processing section for separately and distinctly processing the optimum chrominance signal, wherein said sections process the luminance signal and the optimum chrominance signal using different interpolation programs from each other, the image signal including a signal representing a still picture.

13. The image processing apparatus according to claim 1, wherein the image signal includes a signal representing a moving picture.

14. An image processing apparatus, comprising:

a signal processing section for processing an image signal including a luminance signal and a chrominance signal, wherein the signal processing section processes the luminance signal and the chrominance signal using different interpolation programs from each other, and the chrominance signal being represented by a prescribed format requiring a smaller amount of data and calculation than the luminance signal, and wherein the luminance signal is processed by cubic convolution interpolation, and the chrominance signal is processed by at least one of bi-linear interpolation, nearest neighbor interpolation, simple subsampling, and simple interpolation.

15. An image processing apparatus, comprising:

a signal processing section for performing signal processing of an image signal including a luminance signal and a chrominance signal;

a program storing section having a plurality of types of interpolation programs stored therein; and a program switching section for selecting one of a first program for processing the first signal and a second program for processing the second signal among the plurality of types of interpolation programs based on at least one parameter, the first program including a program for executing cubic convolution interpolation, and the second program including a program for executing at least one of bi-linear interpolation, nearest neighbor interpolation, simple subsampling, and simple interpolation, wherein the signal processing section includes a first signal processing section for processing the luminance signal using the first program and a second signal processing section for processing the chrominance signal using a second program, and the chrominance signal being represented by a prescribed format requiring a smaller amount of data and calculation than the luminance signal.

16. The image processing apparatus according to claim 15, further comprising an image input section for receiving the image signal and outputting the luminance signal and the chrominance signal.

* * * * *